(12) United States Patent
Humphrey

(10) Patent No.: US 6,286,837 B1
(45) Date of Patent: Sep. 11, 2001

(54) COMPRESSOR PISTON ROD PACKING RING SET

(75) Inventor: Joseph R. Humphrey, Middletown, KY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/382,325

(22) Filed: Aug. 24, 1999

(51) Int. Cl.[7] .......................................... F16J 9/12
(52) U.S. Cl. ............................ 277/435; 277/493; 277/546
(58) Field of Search ...................... 277/435, 493, 277/492, 498, 499, 446, 543, 546, 544, 545

(56) References Cited

U.S. PATENT DOCUMENTS

| | | |
|---|---|---|
| 0,722,269 | * 3/1903 | Walters . |
| 0,849,115 | * 4/1907 | France . |
| 0,870,152 | * 11/1907 | Alberger . |
| 1,104,588 | * 7/1914 | Wagner . |
| 1,331,522 | * 2/1920 | Parsons et al. . |
| 1,475,656 | * 11/1923 | Steese . |
| 1,498,104 | * 6/1924 | McCorkle . |
| 1,536,595 | * 5/1925 | Light et al. . |
| 1,655,853 | * 1/1928 | Badeker . |
| 1,721,125 | * 7/1929 | Kirk . |
| 1,828,178 | * 10/1931 | Fox . |
| 1,848,328 | * 3/1932 | Durham . |
| 1,879,855 | * 9/1932 | Morton . |
| 2,068,115 | * 1/1937 | Solenberger . |
| 2,071,914 | 2/1937 | Bentley . |
| 2,212,335 | 8/1940 | Wenzel . |
| 2,272,455 | 2/1942 | Withington . |
| 2,296,116 | * 9/1942 | Pelc . |
| 2,619,392 | * 11/1952 | Brown . |
| 2,729,477 | 1/1956 | Hamilton . |
| 2,772,129 | * 11/1956 | Frisby . |
| 2,776,172 | 1/1957 | Deitrickson . |
| 2,867,458 | 1/1959 | Kroekel . |
| 2,885,249 | * 5/1959 | Payne . |
| 3,391,943 | * 7/1968 | Riley et al. . |
| 3,540,746 | * 11/1970 | Jepsen et al. . |
| 3,544,118 | 12/1970 | Klein . |
| 3,866,924 | 2/1975 | French . |
| 3,889,958 | 6/1975 | Bennett . |
| 3,942,808 | * 3/1976 | Gross . |
| 3,955,673 | 5/1976 | Fosness . |
| 4,289,322 | 9/1981 | Traversari et al. . |
| 4,494,760 | 1/1985 | Spargo . |
| 4,986,168 | * 1/1991 | Geoffroy et al. ...................... 92/194 |
| 5,217,068 | 6/1993 | Newton . |

* cited by examiner

Primary Examiner—Anthony Knight
Assistant Examiner—Alison K. Pickard
(74) Attorney, Agent, or Firm—Maurice L. Miller, Jr.

(57) ABSTRACT

A set of piston rod packing rings for use in each of the packing cups of a gas compressor is disclosed. The packing ring set includes segmented first and second rings constructed of a material such as plastic, nylon, Teflon or bronze. The segments of the first ring have a plurality of opposing ends, each of which plurality preferably forms a radial cut butt joint. The segments of the second ring also have a plurality of opposing ends, each of which plurality preferably forms a butt/tangent joint. The second ring is disposed next to and on a low pressure side of the first ring as measured during a compressor piston rod compression stroke. The packing ring set also includes a third uncut ring constructed of a compressible, non-metallic material and a fourth uncut, anti-extrusion ring constructed of a relatively less compressible material than the third ring such as cast iron, bronze or hard plastic. The first and second rings may each have either a garter spring or a wire disposed endlessly around an outer peripheral edge thereof to hold the same in compression on the piston rod to provide an initial operative gas seal on the rod during start up of the compressor and activation of a compression stroke of the piston rod.

16 Claims, 2 Drawing Sheets

COMPRESSOR PISTON ROD PACKING RING SET

BACKGROUND OF THE INVENTION

This invention relates to the combination or set of packing rings disposed in a packing cup around a gas compressor piston rod to limit the escape of a compressed gas from a compressor cylinder along its reciprocally movable piston rod during operation of the compressor.

This invention relates to the combination or set of packing rings disposed in a packing cup around a gas compressor piston rod to limit the escape of a compressed gas from a compressor along its reciprocally movable piston rod during operation of the compressor. The term "packing ring" as used herein means a ring which is or can be compressed on and around a gas compressor piston rod to form a seal to limit the escape of gas along the piston rod past the seal during at least a portion of a cycle of the piston rod from commencement of a compression stroke to completion an immediately succeeding return stroke.

Each of the individual rings making up the ring combination of this invention are old and well known in the prior art and have long been used alone or in combination with other types of rings in gas compressors. Nevertheless, the particular combination of ring types to which this invention is directed is believed to be novel and will provide enhanced service life as compared to prior art compressor piston rod packing ring combinations. To enhance the service life of a set of rings used in a packing cup around a piston rod, it would be desirable that different ones or pairs of rings in the combination encounter most of the gas compression loading to compress the rings upon the piston rod, during different portions of the compression and return strokes of the reciprocating compressor rod. No prior art combination of packing rings is believed capable of achieving such a result.

By means of my invention, these and other shortcomings of prior art compressor piston rod packing ring combinations are substantially overcome.

SUMMARY OF THE INVENTION

It is an object of my invention to provide a novel piston rod packing for a gas compressor.

It is a further object of my invention to provide a set of rings for a piston rod packing of a gas compressor wherein different rings within the set incur gas pressure differential loading on a piston rod at different times during each compression stroke of the piston rod, depending on whether the gas cylinder pressure is at a low, intermediate or high value, relatively speaking.

Briefly, in accordance with my invention, there is provided, in a packing ring set for a piston rod of a gas compressor which includes a first split packing ring containing a first plurality of arcuately extending segments arranged to form a first annulus wherein opposing ends of successive pairs of said segments each form a joint. A second split packing ring is included which is disposed next to and on a low pressure side of the first ring as measured during a compression stroke of a piston rod of the compressor. The second ring includes a second plurality of arcuately extending segments arranged to form a second annulus. Opposing end portions of successive pairs of the second segments each form a joint. The first and second rings are both mechanically and pneumatically compressible on the piston rod at cylinder gas pressures of the compressor which are less than a preselected intermediate value. A third uncut packing ring is provided which is disposed next to and on a low pressure side of the second ring as measured during the compression stroke. The third ring is constructed of a non-metallic material. The third ring fits loosely on said piston rod and forms an ineffective seal for all of said cylinder gas pressures which are less than said intermediate value and is compressible against the piston rod to form an effective seal at and above the intermediate value up to a preselected high value. A fourth uncut packing ring is likewise provided and disposed next to and on a low pressure side of the third ring as measured during the compression stroke. The fourth ring is constructed of a material which is relatively less compressible than that of the third ring and is compressible on the piston rod at all cylinder pressures which are equal to and greater than the high value to form an effective seal on the piston rod in combination with the third ring. The first and second rings are only minimally compressible on the piston rod when at least one of the third and fourth rings is compressed on the piston rod to form an effective seal.

These and other objects, features and advantages of the present invention will become apparent to those skilled in the art from the following detailed description and attached drawings upon which, by way of example, only a preferred embodiment of my invention is described and illustrated.

DESCRIPTION OF THE PREFERRED EMBODIMENT

Figure 1:
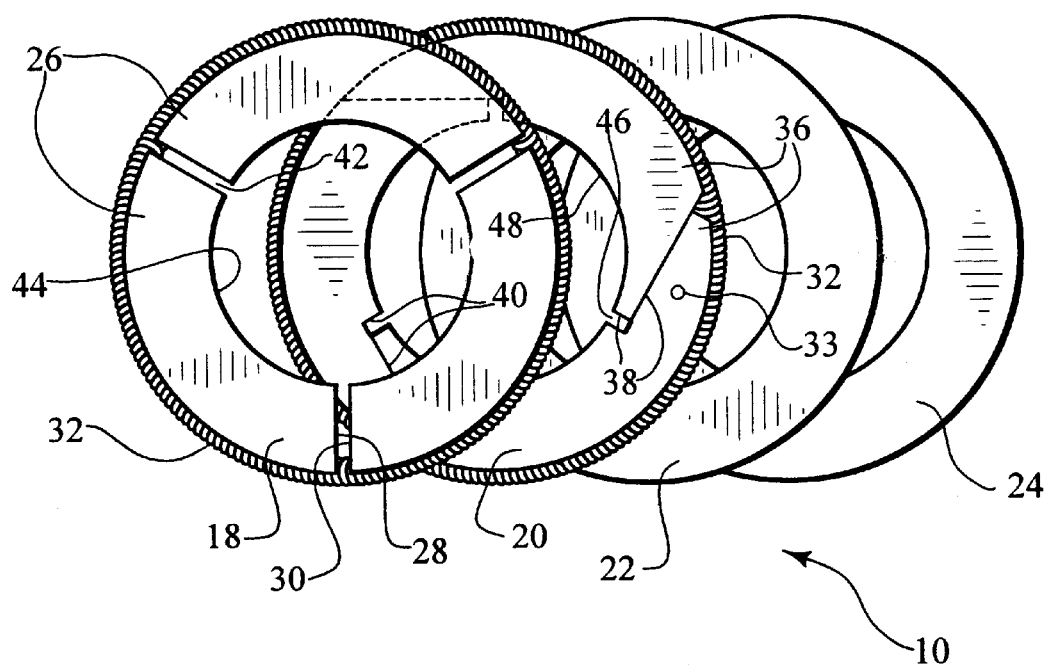
FIG. 1 shows an exploded perspective view of a set of four rings forming a compressor piston rod packing, thus illustrating a preferred embodiment of my invention.
Figure 2:
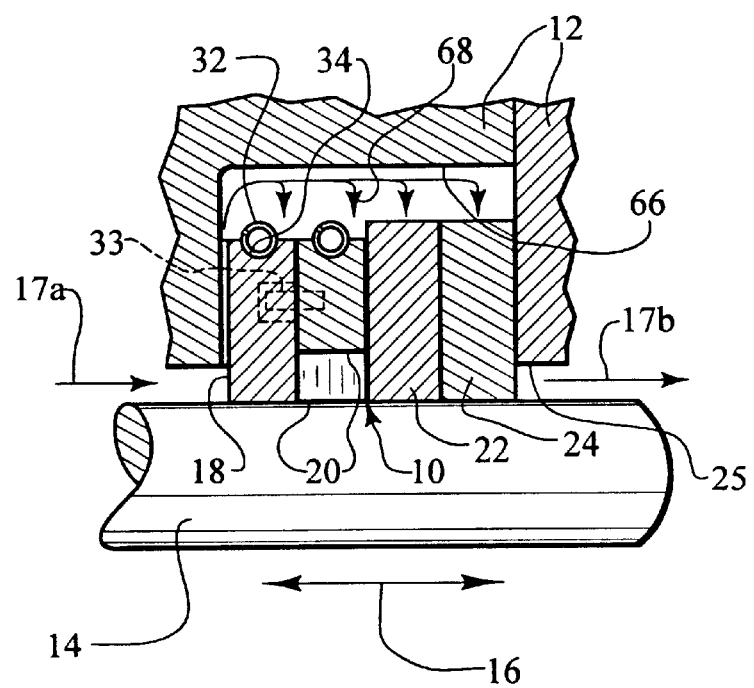
FIG. 2 shows a radial cross-section of a fragment of a compressor piston rod packing cup containing the ring set of FIG. 1, a fragment of a piston rod extending through the cup and ring set being shown in full.

Referring now to the drawing figures and, in particular, to FIGS. 1–2, there is shown, in a preferred embodiment of my invention, a novel piston rod packing, generally designated 10, for disposition in a conventional packing cup 12 around a piston rod 14 of a conventional gas compressor. The piston rod 14 is connected to a piston which is reciprocally movable in a cylinder to compress a gas such as, for example, air or natural gas, as the piston rod reciprocates, all in a usual and well known manner, whereby the piston and cylinder need not be shown. Reciprocal movement of the piston rod 14 is indicated in FIG. 2 by a two headed arrow 16. A compression stroke of the piston rod 14, wherein the piston is moved in the cylinder to compress a quantity of gas, is assumed to be toward the right as viewed in FIG. 2, as indicated by the direction of arrows 17a and 17b. Further, the arrow 17a is assumed to be on the high pressure or cylinder side of the packing 10 and cup 12 and the arrow 17b is assumed to be on the low pressure side of the packing and cup during compression strokes of the piston rod 14 or movement to the right as viewed.

The packing 10 disposed in the cup 12 comprises a set of four annularly shaped packing rings 18, 20, 22 and 24. The first and second rings 18, 20 may be constructed of either a non-metallic material, such as Teflon, nylon or a suitable plastic or, for high pressure applications, may be constructed of a metal alloy such as cast iron or bronze. The third ring 22 may be constructed of a non-metallic material such as Teflon or plastic. The fourth ring 24 functions, in part, as an anti-extrusion ring and restrains the third Ting 22 from being deformed or squeezed into a gap 25 between the cup 12 and the piston rod 14 on the low pressure side of the packing 10 during compression piston rod strokes. The fourth ring may be constructed of plastic, cast iron or bronze.

As shown in FIG. 1, the first ring 18 is a split ring and contains a plurality of, and, preferably, three arcuately extending segments 26, arranged so as to form an annulus, wherein opposing ends 28 and 30 of successive pairs of the segments each form a radial cut butt joint. The ring 18 may contain more than three segments and up to as many as six segments. In the alternative, the ring 18 could include segments which form butt/tangent or true tangent joints, although the butt joint at 42 in FIG. 1 is preferred. A conventional garter spring 32 is disposed in compression in an annular groove 34 formed in and around an outer peripheral edge of the ring 18 and holds the segments 26 in their annular arrangement prior to being disposed on and around the piston rod 14. The garter spring 32 also functions to mechanically compress the ring 18 on and around the piston rod 14 to provide an initial seal of the ring against the rod during start up of the compressor as the piston rod is first activated to execute an initial compression stroke.

The second ring 20 is also a split ring and contains a plurality of, and, preferably, three arcuately extending segments 36 arranged to form an annulus. Opposing ends 38 and 40 of successive pairs of the segments 36 each form a butt/tangent joint. The second ring 20 may also contain more than three segments and up to as many as six segments. The second ring 20 also includes a garter spring 32 for the same purposes as used with the ring 18 as previously explained. A steel wire placed in compression around each of the rings 18 and 20 may be used in place of the garter spring 32 as shown. In the alternative, the ring 20 may contain segments which form true tangent joints, although the butt/tangent joint shown is preferred. It is important that the first two split rings 18 and 20 of the ring set 10 be positioned on and around the piston rod 14 so that gaps 42 in the butt joints of the first ring 18 do not align with the butt/tangent joints of the adjacent second ring 20, as where one of the rings rotationally slips or creeps on the piston rod 14 relative to the other ring. To prevent this from occurring, the first two rings 18 and 20 are joined by a common dowel pin 33 which extends from a high pressure side of the second ring into a bind hole formed in a low pressure side of the first ring. See FIGS. 1–2.

The third and fourth rings 22 and 24 are continuous, uncut rings. The second ring 20 is disposed next to and on a low pressure side of the first ring 18, to the immediate right thereof as viewed in FIG. 2. By "low pressure side" is meant the side of lowest pressure during the compression stroke as indicated by direction of the arrows 17a and 17b. The third ring 22 is disposed next to and on the low pressure side of the second ring 20, to the immediate right thereof as viewed in FIG. 2. The fourth or anti-extrusion ring 24 is located against the low pressure side of the third ring 22 so as to bridge the gap 25 between the cup 12 and the piston rod 14. It is desirable that a gap 42 (See FIG. 1) exist between opposing ends 28 and 30 of successive pairs of the first ring segments 26 which is from about 0.010 inch up to about 0.375 inch when the central bore 44 of the first ring 18 is flush against the piston rod 14 and is in an unworn condition, as when initially placed in service in the cup 12 around the piston rod. The same 0.010 inch to 0.375 inch gap dimension also applies to a gap 46 between the butt portions of each of the butt/tangent joints in the second ring 20 when a central bore 48 of that ring is fit flush with the rod 14 in an unworn condition.

The radial spacing between the cup 12 and the piston rod, as across the gap 25, should preferably be from about 1/16 inch up to about 1/8 inch. The third ring 22 should have a central bore which fits flush against the rod 14 or has a bore diameter which is up to 0.002 inches greater than that of rod. The fourth or anti-extrusion ring 24 should have a central bore large enough to provide a clearance between it and the piston rod of, preferably, from 0.005 inches up to 0.010 inches, although a piston rod clearance range of from 0.001 up to 0.015 is acceptable.

Figure 3:
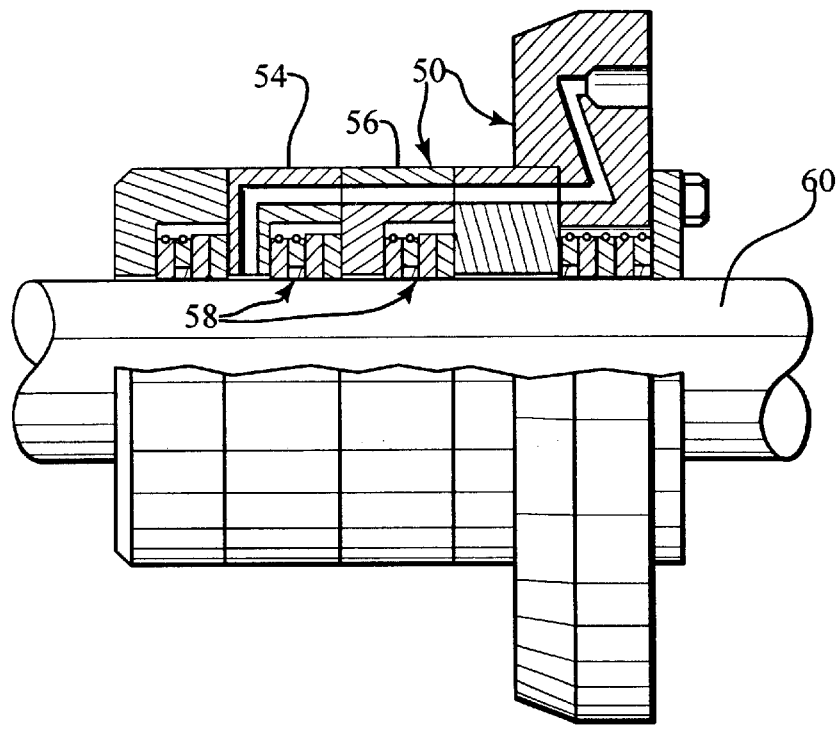
FIG. 3 shows a side view of a compressor piston rod packing case, a portion of which is shown in full and another portion of which is shown in radial cross-section, the packing case containing a series of packing cups, each of which cups contains a ring set as shown in FIGS. 1–2.

Referring now to FIG. 3, a complete packing assembly, generally designated 50, for a piston rod 60 of a natural gas compressor is shown. The assembly 50 shows two packing cups 54 and 56, each containing identical ring sets, generally designated 58, the same as the set 10 as explained in relation to FIGS. 1–2. The individual rings of each of the sets 58 are likewise arranged as shown in FIGS. 1–2 on the assumption that a piston rod 60 executes a compression stroke when in motion toward the right as viewed in FIG. 3, wherein the left side of each set as viewed is a high pressure side and the right side of each set is a low pressure side during a compression stroke.

Figure 4:
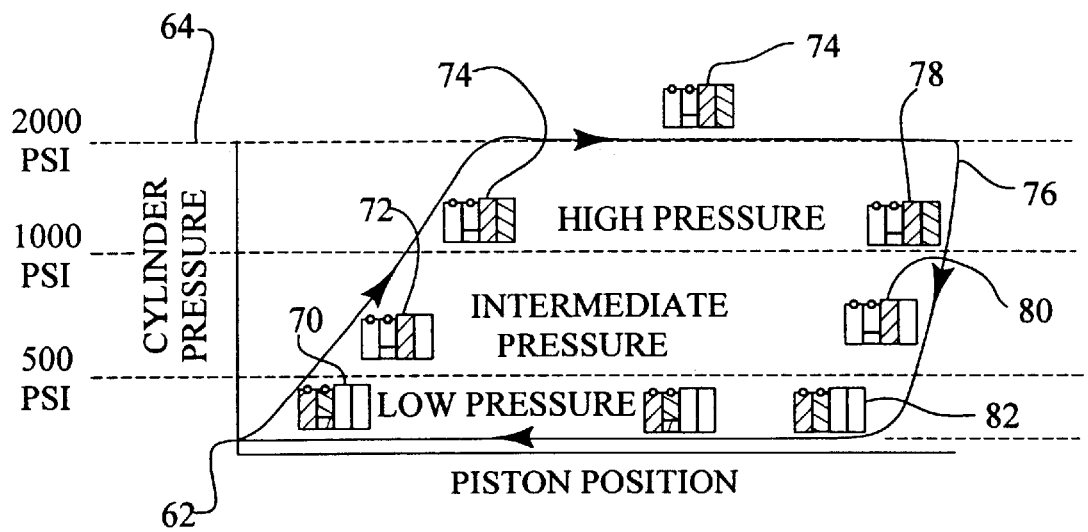
FIG. 4 shows a graph of cylinder pressure in pounds per square inch versus piston position within a compression cycle, thus illustrating gas pressure loading on the various rings of the ring set of FIGS. 1–2 in three different gas pressure ranges.

Referring now also to FIG. 4, a graph is shown which illustrates the gas pressure differential loading on the ring set 10 of FIGS. 1–2 for a typical natural gas compressor of the type typically used to gather natural gas from the ground and compress it for transmission over long distances across the United States. Such compressors typically compress quantities of natural gas during each compression stroke from slightly above atmospheric pressure, as at 62, up to levels in excess of 2,000 psi gauge pressure as at 64. Different rings or pairs of rings in the ring set 10, for example, are pneumatically compressed against the reciprocating piston rod 14 during different periods during the compression stroke due to high pressure gas which enters a ring chamber 66 in the cup 12 between a wall of the cup 12 on the high pressure side 17a and an opposing side of the first ring 18, thus causing a high gas pressure differential to occur across the different rings sufficient to compress them on the piston rod. The gas, as represented by arrows 68, acts radially inwardly around and against the outer peripheral edges of the entire ring set 10. But, at different times during a compression cycle, pressure differentials occurring between the outside diameter and the inside diameter of different ones of the rings in the set 10 causes them to compress and seal against the piston rod 14, while others of the rings see no. such pressure differential and, thus, either do not seal against the rod (as is the case with the third and fourth rings) or are only minimally compressed on the piston rod (as is the case with the first and second rings).

Referring now to FIGS. 1–2 and 4, the latter mentioned figure shows a graph of one complete cycle of gauge pressure of a gas in a cylinder of a typical large commercial natural gas compressor as a function of the position of the compressor piston or corresponding piston rod. The cycle may be said to commence with a piston rod compression stroke and continue through completion of a return stroke. At various positions on the graph there is shown a ring set diagram, such as at 70, similar to the ring set 10 of FIGS. 1–2 wherein certain ones or pairs of rings in the set are cross-hatched. Such cross-hatching represents the ring or pairs of rings within the set 10 which are providing an effective seal to prevent leakage of a gas from the compressor cylinder along the piston rod and out of the compressor during a given portion of the piston or piston rod cycle.

At very low cylinder pressures, as where the piston rod is executing a return stroke during which low pressure gas is being drawn into the cylinder (see the lower horizontally extending portion of the curve 76 in FIG. 4), the first and second rings 18, 20 are only minimally compressed on the piston rod 14 (See also FIG. 2). This minimal compression is due to the mechanical compression of the springs 32 as well as some slight pneumatic compression caused by a relatively slight gas pressure differential then existing between the outside and inside diameters of the rings 18, 20. But this minimal compression of the rings 18, 20 is sufficient during the return stroke to form an effective seal on the piston rod against gas leakage for these very low cylinder pressure values.

As the piston rod completes its return stroke, as at 62 in FIG. 4, valving is closed on the compressor cylinder to trap gas therein to be compressed during the compression stroke to follow. As the piston rod begins the compression stroke by movement to the right as viewed in FIG. 2, the gauge pressure of gas in the cylinder begins to rise up to a preselected minimum value, at which and beyond, the first and second rings are further compressed pneumatically on the rod, due to an increasing gas pressure differential between their outside and inside diameters (See the set diagram 70 in FIG. 4) to maintain an effective seal on the piston rod up to a preselected intermediate value, which, in the present example, is set at about 500 psi. When the cylinder pressure increases to the preselected intermediate value, the gas pressure differential between the outside and inside diameters of the third ring 22 becomes sufficient to pneumatically compress the third ring on the piston rod such that it now forms an effective seal against gas leakage along the piston rod. At all cylinder gas gauge pressures below the preselected intermediate level, the gas pressure differential across the third ring 22 is insufficient to compress it against the piston rod, whereby it remains relatively loose fitting on the rod so that it can not form an effective seal against gas leakage. But when an effective seal is formed by the third ring 22 on the piston rod, as at the preselected intermediate cylinder gas value and higher, leakage occurs around the boundaries and through the joints of the first and second rings 18, 20 to substantially reduce the gas pressure differential thereacross and, consequently, substantially reduce the pneumatic compression loading of those two rings on the piston rod. Accordingly, for cylinder gas pressures from the intermediate value up to a substantially higher preselected high value, the third ring provides the necessary seal against cylinder gas leakage along the rod as indicated by the cross hatched third ring in the ring set diagram at 72 in FIG. 4.

As the piston rod compression stroke continues, gauge pressure in the cylinder rises to the preselected high value, which, in the example of FIG. 4 is about 1,000 psi. At this value, the fourth ring 24 incurs a sufficient gas pressure differential between its outside and inside diameters to also pneumatically compress on the piston rod to form an effective seal, in combination with the previously compressed third ring, for all cylinder pressure values above the preselected high value. See the cross-hatched third and fourth rings in the ring set diagrams at 74 and 78 in FIG. 4.

In the present example, gas pressure in the compressor cylinder rises to about 2,000 psi after which, the compressed gas is vented from the cylinder in the usual, well known manner as, for example, to a pipeline for long distance gas transmission. During the venting process, the gauge pressure in the cylinder drops rapidly from its maximum value down through the preselected high pressure value, at which value, the fourth ring 24 is decompressed and unloaded from the piston rod, leaving the third ring 22 to provide the necessary seal down to the intermediate pressure level. See the ring set diagram at 80 in FIG. 4. As venting continues and as the gas pressure in the cylinder drops below the preselected intermediate pressure value, the third ring 22 becomes decompressed and unloaded from the ring, which action causes rapid recompression and loading of the first and second rings 18, 20 on the piston rod to again provide the necessary gas leakage seal on the piston rod as shown by the cross-hatching in the ring set diagram at 82 in FIG. 4. Thereafter, with cylinder gas venting complete, the piston rod executes a return stroke to draw more low pressure gas into the cylinder, during which period, the first and second rings 18, 20 act to provide the necessary seal on the piston rod to complete the return stroke and a cycle of operation of the compressor.

Those skilled in the art will appreciate that the ring set 10 can also be used with compressors having a maximum cylinder pressure as low as about 300 psi, and, perhaps, somewhat lower. In such a case, the first and second rings 18, 20 would be adapted to provide an effective seal at the lowest cylinder pressure occurring during the piston or piston rod cycle up to a preselected intermediate pressure value of from about 100 to 200 psi, at which intermediate pressure level the third ring 22 would be adapted to compress on the rod to form an effective seal and unload the first two rings. The third ring 22 would then provide an effective seal up to a preselected high pressure value in the range of from about 200 to 300 psi, at which preselected high value, the fourth ring 24 would be adapted to compress on the rod to form an effective seal against gas leakage along the rod in combination with the previously compressed third ring 22 for all cylinder gas pressures at and above this preselected high value. Finally, during venting of the compressor cylinder and the return stroke of the piston rod, as the cylinder pressure decreases, the third and fourth rings would be successively unloaded from the rod in reverse order when the high and intermediate cylinder pressure values are encountered, and the first and second rings 18, 20 would pneumatically recompress of the piston rod upon decompression of the third ring.

The first segmented packing ring 18 of FIGS. 1–2 contains radial cut butt joints with a substantial gap 42 between the segments 26 when in a new and unworn state, since it is desired to effect a gas tight seal of that ring about the piston rod 14 only during the compression stroke of the piston rod. During the return stroke, it is desired that the initially minimally compressed ring 18, as is the case for high cylinder pressures above about 500 psi, permits gas to flow backward from the ring chamber 66 (FIG. 2) through the ring gaps 42 (FIG. 1) to the left of the cup 12, as viewed, to the compressor cylinder opposite the direction of the arrow 17a.

With regard to the second segmented ring 20, it is desired that an essentially gas tight ring seal occur around the piston rod 14 during both the compression and return strokes of the piston rod for all cylinder gas pressures below the intermediate level. For this reason, the successive segments of the second ring 20 employ butt/tangent joints so as to seal the rod 14 during both directions of piston rod travel. The gaps 42 between the segments 26 of the first ring 18 and gaps 46 between butt portions of the butt/tangent joints of the second ring 20 are provided so as to permit the bores 44 and 48, respectively, of those rings to wear and thus become enlarged over time without closing of those gaps. Ultimately, of course, when the bores 44 and 48 have worn sufficiently, the gaps 42 and 46 will close to essentially end the useful life of the rings 18 and 20. But by providing the set of rings, such as at 10 in FIGS. 1–2, wherein different rings or pairs of rings assume the majority of the gas pressure differential loading against the piston rod during different portions of compression and return piston strokes, the useful service life of the first and second rings 18, 20 and of the ring set, as a whole, is substantially increased over that of prior art packing ring sets.

Although the present invention has been described and shown with respect to specific details of a certain preferred embodiment thereof, it is not intended that such details limit the scope and coverage of this patent other than as specifically set forth in the following claims.

I claim:

1. In a packing for a piston rod of a gas compressor, a packing ring set comprising a first split packing ring containing a first plurality of arcuately extending segments arranged to form a first annulus, wherein opposing ends of successive pairs of said segments each form a joint;

a second split packing ring disposed next to and on a low pressure side of said first ring as measured during a piston rod compression stroke, said second ring containing a second plurality of arcuately extending segments arranged to form a second annulus, wherein opposing end portions of successive pairs of said segments each form a joint, said first and second rings being compressible on said piston rod at all gas pressures in a cylinder of said compressor which are less than a preselected intermediate value;

a third uncut packing ring disposed next to and on a low pressure side of said second ring as measured during said piston rod compression stroke, said third ring being constructed of a non-metallic material and being compressible on said piston rod at all gas pressures in said cylinder which are equal to and greater than said intermediate value; and a fourth uncut packing ring disposed next to and on a low pressure side of said third ring, said fourth ring being constructed of a relatively less compressible material than is used to construct said third ring, said fourth ring being compressible on said piston rod along with said third ring at all gas pressures in said cylinder which are equal to and greater than a predetermined high value.

2. The packing ring set of claim 1 wherein said first plurality of segments comprises at least three.

3. The packing ring set of claim 1 wherein said second plurality of segments comprises at least three.

4. The packing ring set of claim 1 further comprising first compression means extending endlessly on and around a radially outer peripheral edge of said first ring for maintaining said first plurality of segments in an annular arrangement prior to installation of said first ring in a packing cup around a piston rod and for providing an initial mechanical compression of said first ring on and around said piston rod to form an initial gas seal of said first ring around said piston rod during starting movement of said piston rod in a gas compressor.

5. The packing ring set of claim 1 further comprising second compression means extending endlessly of and around a radially outer peripheral edge of said second ring for maintaining said second plurality of segments in an annular arrangement prior to installation of said second ring in a packing cup around a piston rod and for providing an initial mechanical compression of said second ring on and around said piston rod to form an initial gas seal of said second ring around said piston rod during starting movement of said piston rod in a gas compressor.

6. The packing ring set of claim 1 wherein said first compression means comprises a first spring.

7. The packing ring set of claim 1 wherein said second compression means comprises a second spring.

8. The packing ring set of claim 1 wherein said first and second ring each comprise a material selected from the group consisting of Teflon, nylon, plastic, cast iron and bronze.

9. The packing ring set of claim 1 wherein said third ring comprises a material selected from the group consisting of Teflon and plastic.

10. The packing ring set of claim 1 wherein said fourth ring comprises a material selected from the group consisting of plastic, cast iron and bronze.

11. The packing ring set of claim 1 further comprising means for connecting said first ring to said second-ring such that the joints in said first ring do not align with the joints in said second ring.

12. The packing ring set of claim 11 wherein said means comprises a dowel pin extending from one side of said second ring into a blind hole formed in said first ring.

13. The packing of claim 1 wherein said first split packing ring comprises a radial butt cut packing ring and said second split packing ring comprises a butt/tangent cut packing ring, said second ring being located next to and on a low pressure side of said first ring.

14. The packing of claim 1 wherein said first split packing ring comprises a radial butt cut packing ring and said second split packing ring comprises a true tangent cut packing ring, said second ring being located next to and on a low pressure side of said first ring.

15. In combination with a gas compressor which includes a reciprocally movable piston rod for compressing a quantity of gas to a maximum pressure in excess of about 300 psi during a compression stroke and a plurality of packing cups disposed next to one another and mounted in spaced apart relationship over and around said piston rod, said packing cups each being adapted to contain a set of packing rings, each said set of packing rings comprising a first split packing ring containing a first plurality of ring segments arranged to form an annulus about said piston rod wherein opposing ends of said first segments each form a radial cut butt joint having an initial gap of from about 0.010 inch to about 0.375 inch when a central bore of said first ring is in operative contact around and against said piston rod and when said first ring is unworn;

a second packing ring containing a second plurality of ring segments arranged to form an annulus about said piston rod wherein opposing end portions of said second segments each form a butt/tangent joint having a gap between radially opposing end portions of from about 0.010 inch to 0.035 inch when a central bore of said second ring is in operative gas sealing contact around and against said piston rod and when said second ring is unworn, said second ring being next to and on a low pressure side of said first ring as measured during a compression stroke of said piston rod;

a third uncut packing ring constructed of a non-metallic material and having a central bore which sized to a diameter between that which is equal to the diameter of said piston rod and about 0.010 inches greater than the diameter of said piston rod when said third ring is unworn, said third ring being next to and on a low pressure side of said second ring as measured during a compression stroke of said piston rod;

a fourth uncut packing ring constructed of a relatively non-compressible material for functioning as an anti-extrusion ring in said set, said fourth ring having a central bore whose radius is from about 0.001 inches to about 0.015 inches greater than the diameter of said piston rod when said fourth ring is unworn, said fourth ring being next to and on a low pressure side of said third ring as measured during a compression stroke of said piston rod.

16. A sacking rings for disposition in a packing cup on a piston rod of a gas compressor for reducing a leakage of a compressed gas from a cylinder of said compressor along said piston rod and out of said compressor, said set comprising first and second split packing rings for disposition next to each other, each of said first and second rings including at least three arc shaped segments successively joined to form an annulus having at least three joints which are at least partially gapped, said first and second rings being minimally compressible, mechanically and pneumatically, against said piston rod to form an effective seal against said leakage for all gauge pressures of said cylinder gas which are less than a preselected minimum value and being further compressible, pneumatically, against said piston rod to form an effective seal against said leakage for all gauge pressures of said cylinder gas which are equal to and greater than said minimum value up to a preselected intermediate value, said intermediate value being substantially greater than said minimum value;

a third uncut packing ring for disposition next to a low pressure side of said first and second rings, in combination, as measured during a compression stroke of said piston rod, said third ring being sufficiently loose fitting on said piston rod to form an ineffective seal against said leakage at all gauge pressures of said cylinder gas which are less than said intermediate value, said third ring being compressible, pneumatically, against said piston rod to form an effective seal against said leakage for all gauge pressures of said cylinder gas which are equal to and greater than said intermediate value up to at least a preselected high value which is substantially greater than said intermediate value; and a fourth uncut ring for disposition next to a low pressure side of said third ring as measured during said compression stroke and being sufficiently loose fitting on said piston rod to form an ineffective seal against said leakage for all gauge pressures of said cylinder gas which are less than said high value and being compressible, pneumatically, on said piston rod to form, in combination with said third ring, an effective seal against said leakage for all gauge pressures of said cylinder gas which are equal to and greater than said high value, said first and second rings being only minimally compressible on said piston rod for all gauge pressures of said cylinder gas which are equal to and greater than said intermediate value, due to an effective seal against said leakage being formed by at least one of said third and fourth rings.

* * * * *